United States Patent
Ormond et al.

(10) Patent No.: US 11,076,060 B2
(45) Date of Patent: Jul. 27, 2021

(54) SYSTEM AND METHOD FOR MONITORING, RECOMMENDING AND UPDATING MULTIFUNCTION PERIPHERALS VIA A HANDHELD DEVICE

(71) Applicant: Toshiba TEC Kabushiki Kaisha, Shinagawa-ku (JP)

(72) Inventors: Louis M. Ormond, Irvine, CA (US); Guillermo Hernandez Gallegos, Zapopan (MX)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/801,482

(22) Filed: Feb. 26, 2020

(65) Prior Publication Data

US 2021/0136238 A1 May 6, 2021

Related U.S. Application Data

(60) Provisional application No. 62/930,094, filed on Nov. 4, 2019.

(51) Int. Cl.
*H04N 1/00* (2006.01)
*G06F 3/12* (2006.01)
*H04N 1/32* (2006.01)

(52) U.S. Cl.
CPC ......... *H04N 1/00307* (2013.01); *G06F 3/123* (2013.01); *G06F 3/1204* (2013.01);
(Continued)

(58) Field of Classification Search
None
See application file for complete search history.

(56) References Cited

U.S. PATENT DOCUMENTS 6,732,195 B1 * 5/2004 Baldwin ............... G06F 3/121
710/18
8,941,859 B2 * 1/2015 Atobe ............... H04L 69/24
358/1.15

(Continued)

FOREIGN PATENT DOCUMENTS

EP 3537282 A1 9/2019
JP 2005208339 A * 8/2005

OTHER PUBLICATIONS

English Translation of Japanese Application 2004-014855, corresponding to Japanese Application Publication 2005-208339 (Year: 2004).*

*Primary Examiner* — Thomas D Lee
(74) *Attorney, Agent, or Firm* — Ulmer & Berne LLP

(57) ABSTRACT

A system and method for maintaining and optimizing a fleet of multifunction peripherals is operated by use of a smartphone. The smartphone provides recommendations to configure multifunction peripherals or other equipment fleets to avoid service calls. The smartphone is configured to allow a user to review device status for a fleet of multifunction peripherals so that the user knows which multifunction peripherals will need attention. The system provides the user with alerts of issues, with predictions before issues occur, and with a prescription for what to do so that the user can resolve the issue themselves. The system further provides recommendations based on needs, usage, and other customer usage or purchase data to allow the user to review multifunction peripherals, purchase services, install options and configure devices in the fleet for optimization.

20 Claims, 6 Drawing Sheets

(52) U.S. Cl.
CPC ....... *G06F 3/1231* (2013.01); *H04N 1/00074* (2013.01); *H04N 1/32539* (2013.01)

(56) References Cited

U.S. PATENT DOCUMENTS

| | | |
|---|---|---|
| 2011/0051165 A1 | 3/2011 | Yamada |
| 2014/0333966 A1* | 11/2014 | Heemels ............ H04N 1/00061 |
| | | 358/1.15 |
| 2016/0313952 A1* | 10/2016 | Kawasaki ............. G06F 3/1219 |

* cited by examiner

SYSTEM AND METHOD FOR MONITORING, RECOMMENDING AND UPDATING MULTIFUNCTION PERIPHERALS VIA A HANDHELD DEVICE

CROSS-REFERENCE TO RELATED APPLICATIONS

This application claims the benefit of U.S. Provisional Application No. 62/930,094 filed Nov. 4, 2019, which is incorporated herein by reference.

TECHNICAL FIELD

This application relates generally to management of groups of multifunction peripherals. The application relates more particularly to use of a handheld device to retrieve status data from a fleet of multifunction peripherals to provide user selectable device modifications based on suggestions determined from fleet status data.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Many businesses have a large number of MFPs in service. It may be extremely difficult to determine what could be done to improve device operations or user convenience for a large number of devices.

BRIEF DESCRIPTION OF THE DRAWINGS

Various embodiments will become better understood with regard to the following description, appended claims and accompanying drawings wherein:

DETAILED DESCRIPTION

Figure 1:
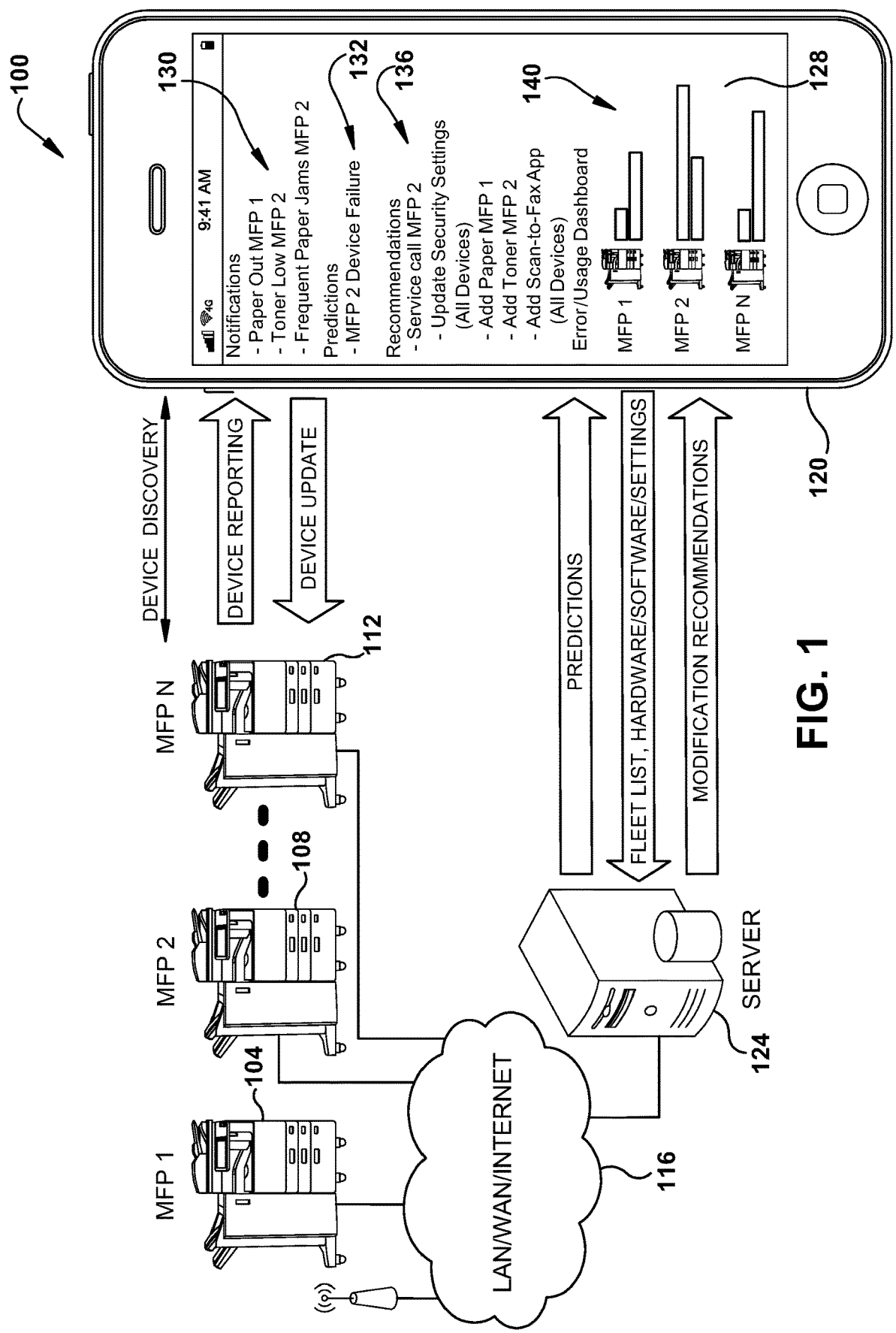
FIG. 1 is an example embodiment of a multifunction peripheral fleet maintenance system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Recommendation engines are often used to recommend products and services to users based on the characteristics of other similar users and/or products. Currently, art exists to make predictions for an MFP based on similar MFPs. Using this data is difficult for most users in a business environment for problem solving.

Example embodiments described herein provide a system and method for users of portable data devices, such as smart phones or tablet computers, to get recommendations to configure MFPs in a fleet, or other type of equipment fleet, to help avoid the need to make service calls, or to lessen a frequency of service calls. The device application allows a user to review a status of their MFP fleet so that they know which machines will need attention. The system provides end users with alerts of issues, predictions before issues occur, and with prescriptions for what to do so that they can resolve the issue themselves. The system provides recommendations based on needs, usage, and other customer usage or purchase data to allow the end user to review, select and install configuration options for their equipment fleet to optimize equipment usage. Configuration data from MFPs in a fleet is aggregated. A portable data device collects fleet device information, which information is aggregated and sent to a cloud service for processing and analysis to provide predictions and suggestions for device reconfiguration, software modification or hardware modification. Recommendation data is then received from the cloud service, and it is presented to the user to aid them in making intelligent product configuration selections. Such use of a portable data device for prediction of issues, issue alerts, and resolution information to an end user helps them avoid making unnecessary service calls.

In further example embodiments, portable data devices, such as a smartphones or tablets are supplied with applications and access to a backend cloud service. The backend cloud service includes a data aggregator and recommendation service. The data aggregator collects configuration data from equipment that is connected to the backend cloud service and stores it for processing. The recommendation service uses the stored aggregated data to analyze the configuration settings of all equipment providing data. The result of the analysis is a set of recommendations. The recommendations may be categorized into applications, configurations, equipment, professional services, predictions, break-fix service, or the like. Applications may comprise applications that can be loaded on the equipment to provide added-value to end users. Configurations may comprise settings such as security, energy saving, eco-friendly, accessibility, and convenience. Equipment may include options to be installed on the reporting equipment, or additional equipment in order to optimize usage. Professional services include fleet evaluations for cost, security, optimization, placement, and other reasons. Predictions can be used to alert end users of potential problems with their equipment and provide a means for resolution. A break-fix service is a call placed to a servicing organization to fix broken equipment. The recommendation service also suitably provides an interface in the form of an application program interface (API) to the smartphone or tablet application. This API allows the smartphone to forward locally discovered equipment data to the cloud service, receive recommendations, and receive notifications when recommendations have been updated.

The smartphone or tablet application includes a method to register a customer, discover a fleet of equipment on a local network, receive alerts from the equipment, and interface with the backend cloud service. This application also generates a user interface for user device interaction.

In a more particular example embodiment, a user will first register themselves as the application user and owner of the discovered equipment fleet. The application will discover equipment on the user's network, such as a local network, to form a device list. Identifying information, such as device serial numbers, will be stored locally. This information is also sent to the recommendation cloud service interface. After sending, the cloud service returns recommendations to the application. The application then displays them to the user. The user may select the recommendations, and if appropriate, the application will then interface with the equipment for updating. The application includes an ability to poll devices periodically to collect information and confirm status for the user. This polling capability suitably executes in the foreground when the app is in use, or in the background when the app is closed. This provides the user with continuous status monitoring. The backend cloud service suitably interfaces with a purchase system to allow the purchase of recommended equipment or services.

In accordance with the subject application, FIG. 1 illustrates an example embodiment of a MFP fleet maintenance system 100 including MFPs 104, 108 and 112. A fleet is suitably comprised of any number of MFPs, which may be of the same or different types. In the illustrated example, MFPs 104 and 108 share the same capabilities and MFP 112 has different capabilities. Each MFP is suitably identified by a unique identifier, such as via their IP address. Listing of fleet MFPs can be done automatically, such as by network device discovery, or by manual addition or deletion of devices. Devices in FIG. 1 are in data communication across a network 116 through any suitable wired or wireless means, via a local area network (LAN), wide area network (WAN), which may comprise the Internet, or any suitable combination thereof. A portable data device, such as smartphone 120 discovers networked devices, such as MPFs 104, 108 and 110. The MFPs provide report device status data to smartphone 120. Smartphone 120 includes a user interface including a user input and a display, suitably integrated as a touchscreen display 128. Device status data may include hardware configuration data, software configuration data and device settings data. Software configuration data may include identification of firmware, operating systems or applications on MFPs, which may include version information. Hardware configuration information may include available hardware resources, such as presence or absence of a finisher, paper tray, near field communications (NFC) reader, Bluetooth, Wi-Fi, keyboard, scanner, stapler or hole puncher. Device settings data may include levels of consumables, such as toner, ink or paper. Device settings may also include device alerts, device errors or error conditions, sensor readings, such as temperature or humidity levels, as well as page count information.

In the example of FIG. 1, reported device information is communicated from smartphone 120 to server 124 as fleet data. Server 124 is suitably a cloud server that can support more than one MFP fleet as a service. Server 124 analyzes aggregated fleet data and returns predictions, such as failure predictions, as well as modification recommendations to smartphone 120 for display on smartphone touchscreen 128. In the illustrated example, notifications 130, predictions 132 and recommendations 136 are shown on touchscreen 128. Recommendations may be one or more of software additions or deletions, including firmware or applications, hardware additions or removal or changes in device settings. Example device settings may include device policies, hardware settings, software settings or device configuration. Example device configuration may include configuration of security settings, energy conservation settings, such as an "eco mode," or an accessibility mode added to a user interface. Display 128 also illustrates a dashboard report 140, including MFP information, such as error levels or usage levels for monitored MFPs.

Figure 2:
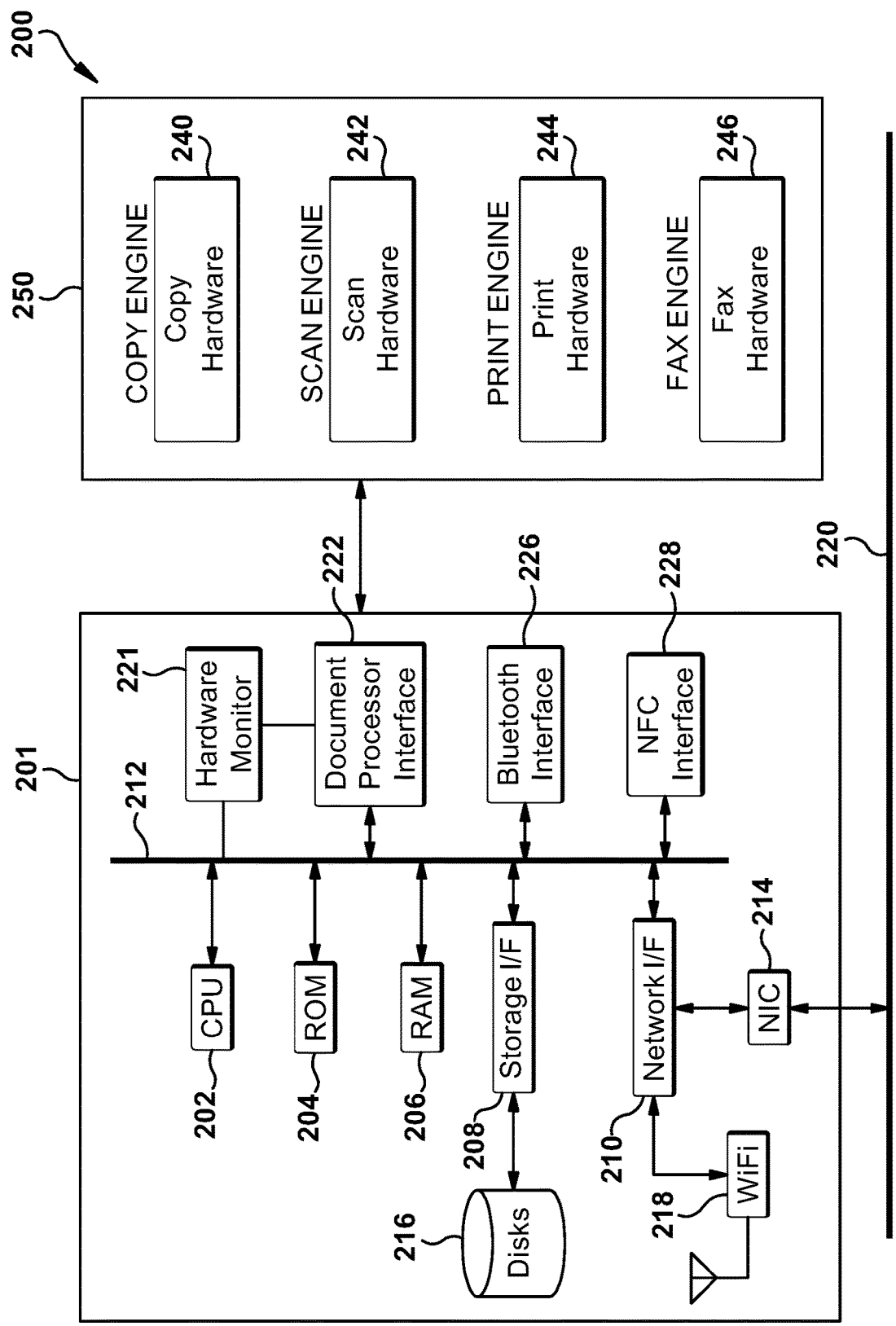
FIG. 2 is an example embodiment of a networked digital device comprising a document rendering system.

Turning now to FIG. 2 illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication with a document processor interface 222, with Bluetooth interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrated example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
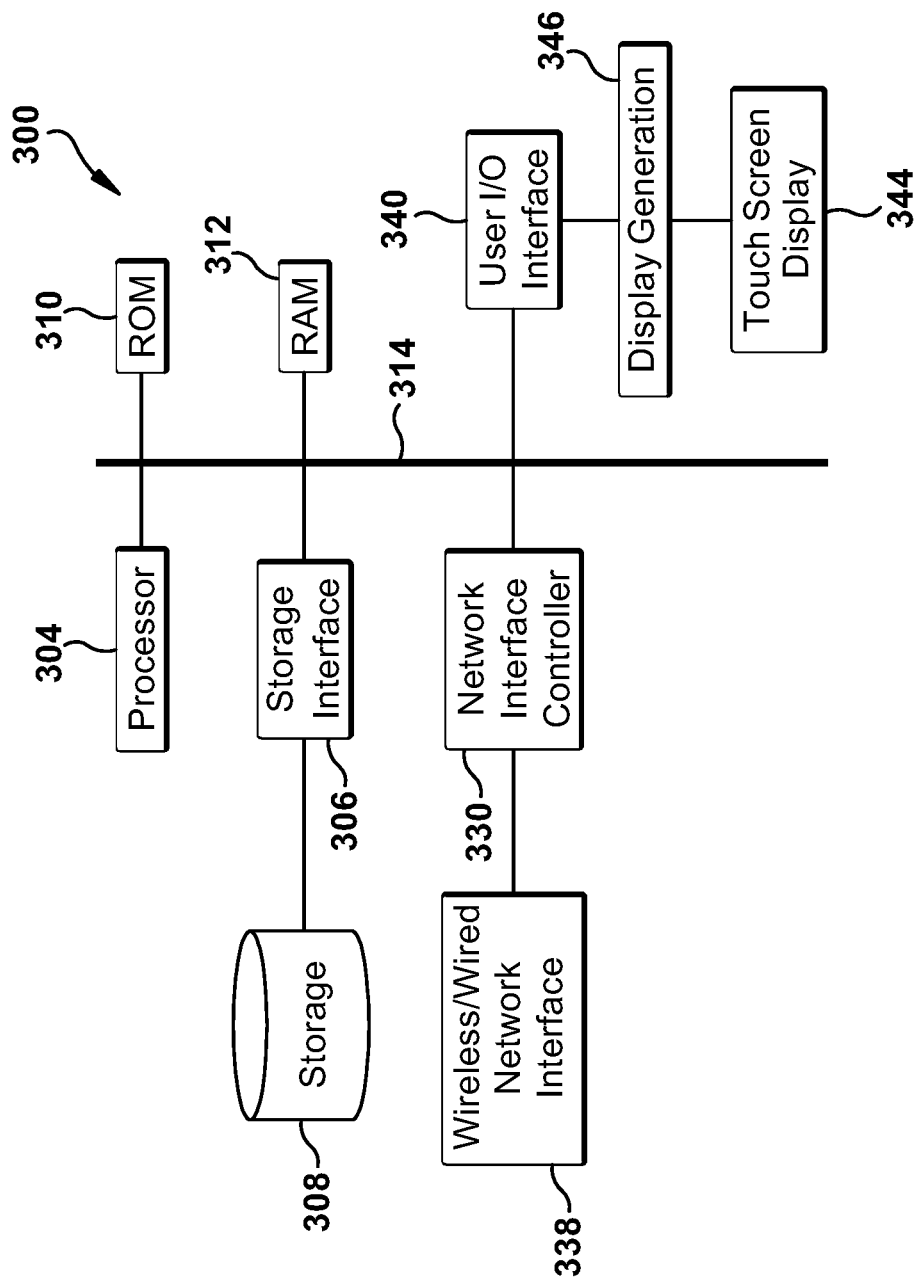
FIG. 3 is an example embodiment of a digital device system such as a smartphone or tablet computer.

Turning now to FIG. 3, illustrated is an example of a digital device system 300 suitably comprising smartphone 120 and server 124 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
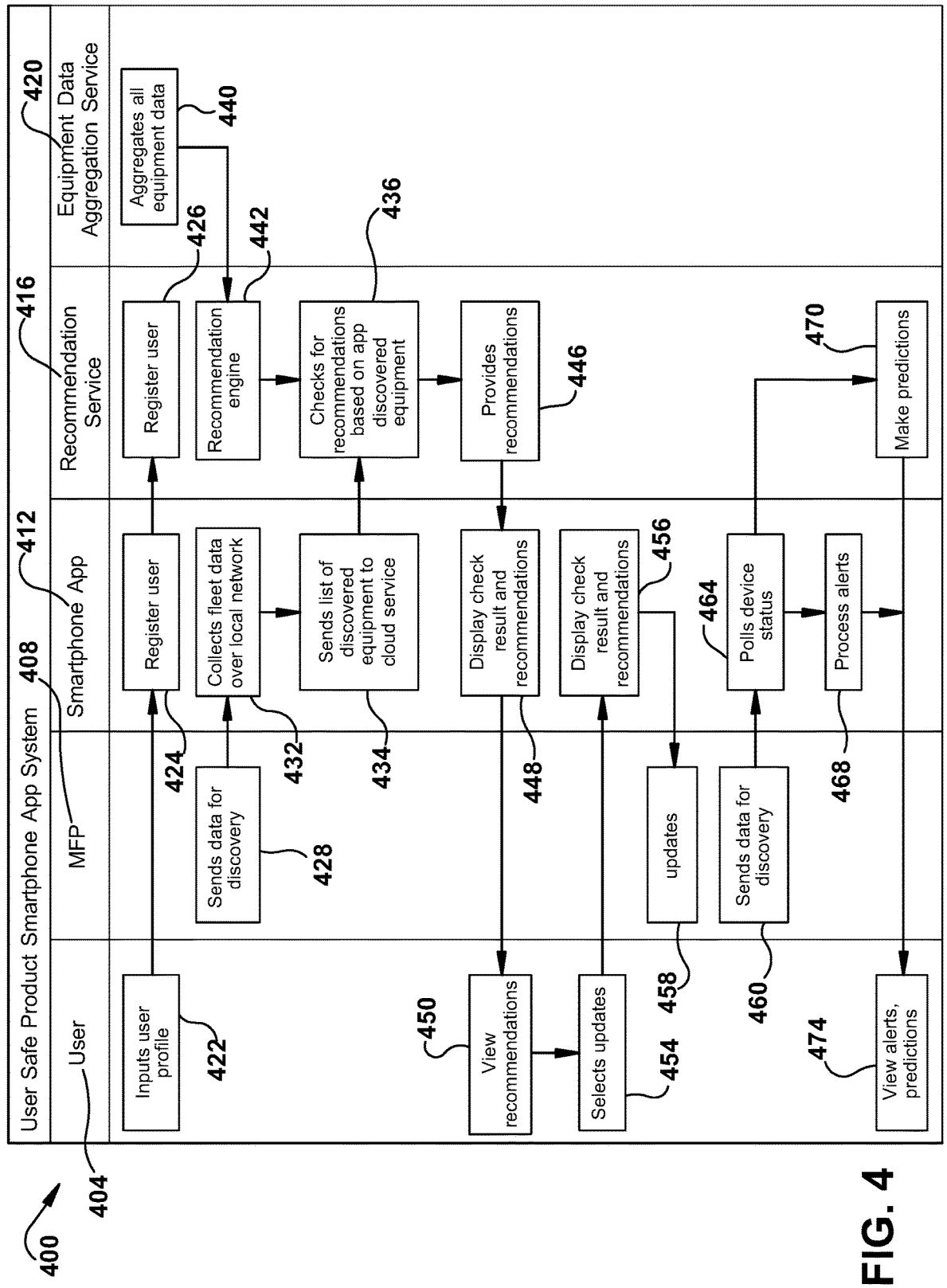
FIG. 4 is a diagram of an example embodiment of interaction between a user, one or more MFPs and a smartphone app.

FIG. 4 is a diagram 400 showing interaction between user 404, one or more MFPs, illustrated by MFP 408, smartphone app 412, suitably executing on smartphone 120 of FIG. 1, recommendation service 416 and equipment data aggregation service 420. It is to be appreciated that recommendation service 416 and data aggregation service 420 are cloud services, suitably undertaken by one or more cloud servers, such as server 124 of FIG. 1. In the illustrated example, a process commences at block 422 when user 404 inputs their profile into smartphone app 412 at block 424. The user is then registered with recommendation service 416 at block 426.

MFP 408 sends data for discovery to smartphone app 412 at block 428, which data is collected at block 432, and a list of discovered equipment is sent to recommendation service 416 at block 434. Data aggregation service 420 aggregates equipment data at block 440, and feeds it to a recommendation engine of recommendation service 416 at block 442. Block 436, working with discovered equipment information from block 434 and recommendation engine output from block 442 leads to generation of recommendations at block 446. These recommendations are communicated to smartphone app 412 at block 448 for display to user 404 at block 450. The user 404 selects one or more upgrade or modification suggestion at block 454, and smartphone app 412 generates a user display at block 456 to display and check results and recommendations. Updates or modifications from user selections are applied at MFP 408 at block 458.

Further in the example of FIG. 4, MFP 408 sends data for discovery to smartphone app 412 at block 460, responsive to polling at block 464 completed by smartphone app 412. Resulting alerts are processed on smartphone app 412 at block 468, and device status is also communicated to recommendation service 416 where corresponding predictions are made at block 470. Predictions are communicated via smartphone app 412 to user 404 at block 474 for viewing.

Figure 5:
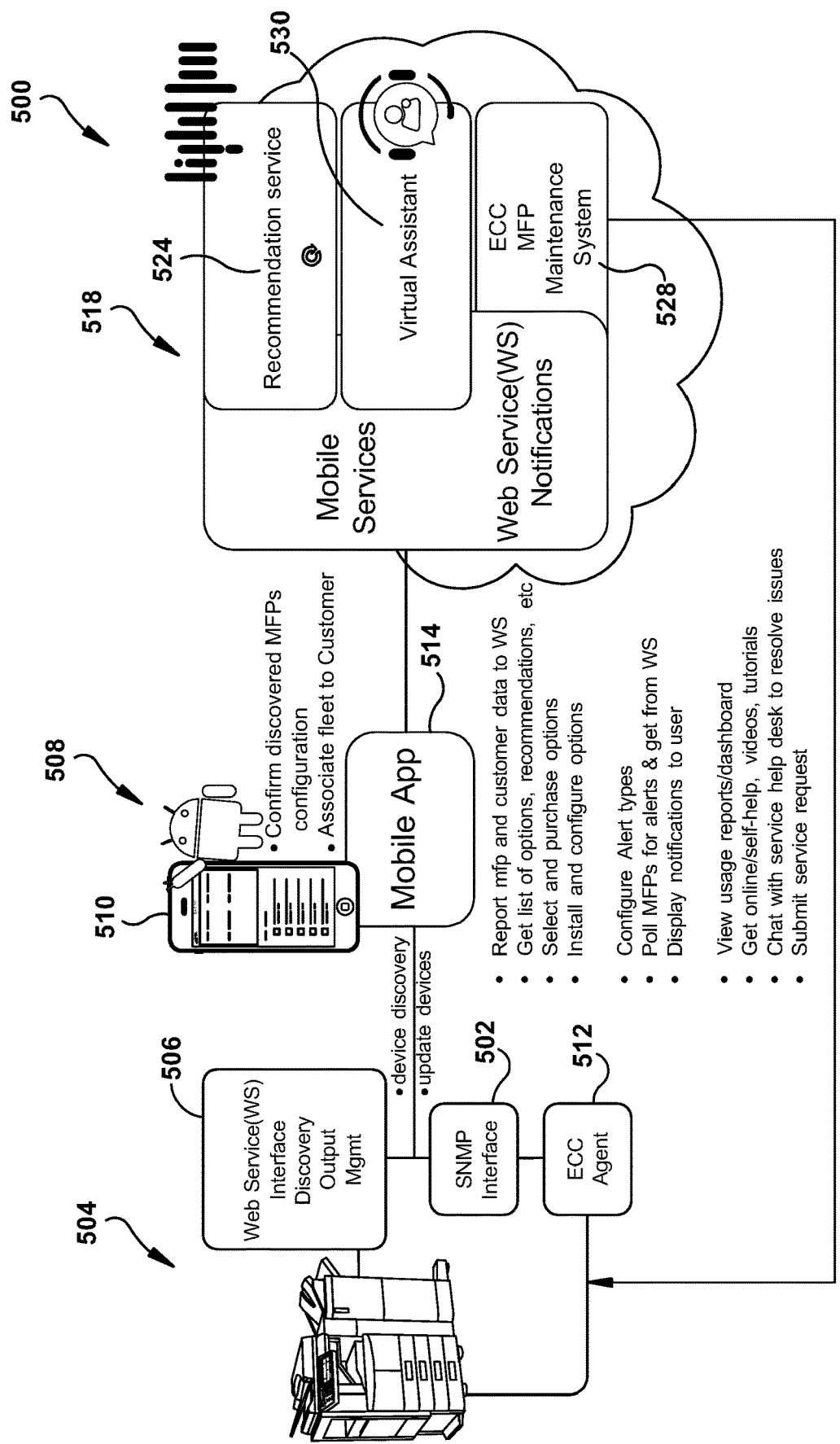
FIG. 5 is an example embodiment of a system for monitoring, recommending and updating multifunction peripherals via a handheld device.

FIG. 5 illustrates an overview 500 of a system for monitoring, recommending and updating multifunction peripherals via a handheld device. MFP 504 includes a web service (WS) interface 506 and provides status information, suitably via SNMP interface 502. An example web service interfaces is found with TopAccess, available from Toshiba TEC. A device maintenance agent is also included allowing the MFP to be monitored, updated or configured remote with a system such as Toshiba TEC' s eBridge CloudConnect (ECC) via ECC agent 512. Smartphone system 508 includes smartphone 510 and a mobile app 514. Smartphone system 508 discovers MFPs, such as MFP 504, and obtains device information. Smartphone system 508 further directs device updates, modifications or configurations to MFP 504. MFP Smartphone system 508 communicates with cloud server system 518, which includes recommendation service 524 and ECC service 528. Cloud server system 518 also suitably provides virtual assistant subsystem 530 to assist users if needed.

Figure 6:
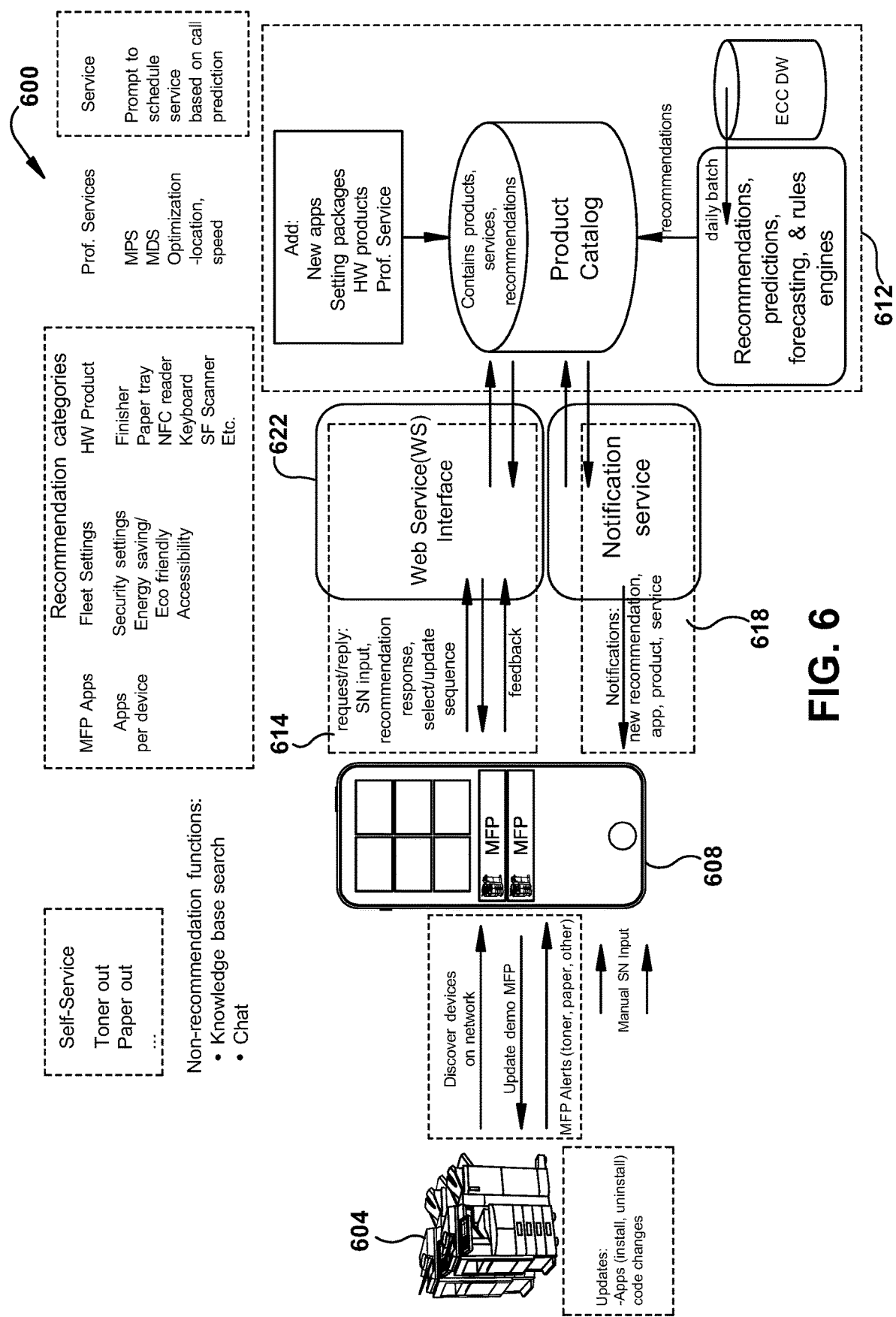
FIG. 6 is a hardware diagram of an example embodiment of a system for monitoring, recommending and updating multifunction peripherals via a handheld device.

FIG. 6 illustrates an example embodiment of a hardware diagram of a system 600 for monitoring, recommending and updating multifunction peripherals via a handheld device. Illustrated are interactions among MFP 604, smartphone 608 and cloud service 612. MFP 604 can be provided with updates, applications to install or uninstall, or configuration changes. Smartphone 608 can display self-service information, such as toner or paper replacement. Smartphone 608 also serves as a gateway for knowledge base searching or assistant chatting. Cloud service 612 interacts with smartphone 608 via interface 614 and notification service 618. Interface 614 includes a web service interface 622 and can transmit device identifiers, such as device serial numbers, recommendations, and update or configuration changes. Notification service 618 suitably provides notifications, including alerts, new product recommendations, new service recommendations, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a data interface configured to receive device status data from each of a plurality of multifunction peripherals, the device status data corresponding to one or more of installed software, installed software versions, installed hardware, device configuration, consumable levels, device usage levels, device errors or device alerts;
   a memory storing fleet data comprising device status data for each of the multifunction peripherals;
   a processor configured to send fleet data to an associated server via the data interface;
   wherein the processor further configured to receive, responsive to sending of the fleet data, for each of the multifunction peripherals, report data corresponding to predictive device failures, suggested device maintenance and suggested device modifications,
   wherein the processor is further configured to display report data on an associated user interface.

2. The system of claim 1 wherein the processor is further configured to display the report data including recommended software modification to one or more multifunction peripherals.

3. The system of claim 1 wherein the processor is further configured to display the report data including recommended hardware modification to one or more multifunction peripherals.

4. The system of claim 1 wherein the processor is further configured to display the report data including recommended device settings modification to one or more multifunction peripherals.

5. The system of claim 1 wherein the processor is further configured to display the report data including dashboard data associated with the fleet data.

6. The system of claim 1 wherein the processor is further configured to display the report data including one or more failure predictions for an identified multifunction peripheral.

7. The system of claim 1 wherein the data interface is further configured to receive software installation instructions or device reconfiguration instructions responsive to sending of the fleet data.

8. The system of claim 7 wherein the processor is further configured to direct installation of software or reconfiguration of one or more multifunction peripherals in accordance with received instructions.

9. A method comprising:
receiving, into a data interface, device status data from each of a plurality of multifunction peripherals, the device status data corresponding to one or more of installed software, installed software versions, installed hardware, device configuration, consumable levels, device usage levels, device errors or device alerts;
storing configuration data comprising device status data for each of the multifunction peripherals;
sending fleet data to an associated server via the data interface;
receiving, responsive to sending fleet data, for each of the multifunction peripherals, report data corresponding to predictive device failures, suggested device maintenance and suggested device modifications;
displaying report data on an associated interface.

10. The method of claim 9 further comprising displaying the report data including recommended software modification to one or more multifunction peripherals.

11. The method of claim 9 further comprising displaying the report data including recommended hardware modification to one or more multifunction peripherals.

12. The method of claim 9 further comprising displaying the report data including recommended device settings modification to one or more multifunction peripherals.

13. The method of claim 9 further comprising displaying the report data including dashboard data associated with the fleet data.

14. The method of claim 9 further comprising generating the report data including one or more failure predictions for an identified multifunction peripheral.

15. The method of claim 9 further comprising receiving software installation instructions or device reconfiguration instructions responsive to sending of the fleet data.

16. The method of claim 15 further comprising directing installation of software or reconfiguration of one or more multifunction peripherals in accordance with received instructions.

17. A system comprising:
memory;
a user interface including a user input and a display;
a data interface; and
a processor,
the processor configured to retrieve device status data from each of a plurality of multifunction peripherals,
the processor further configured to generate fleet data corresponding to device status data retrieved from each of the multifunction peripherals,
the processor further configured to send generated fleet data to an associated server via the data interface,
the processor further configured to receive multifunction peripheral modification suggestion data from the associated server responsive to sending the fleet data,
the processor further configured to generate a display of multifunction peripheral modification options, corresponding to received modification suggestion data, on the display,
the processor further configured to receive user instructions responsive to displayed modification options, and
the processor further configured to send device reconfiguration instructions to the multifunction peripherals in accordance with received user instructions.

18. The system of claim 17 wherein the device status data includes one or more of multifunction peripheral hardware configuration data, software configuration data or device settings data.

19. The system of claim 18 wherein
hardware configuration data reflects configuration of one or more of a finisher, paper tray, NFC reader, keyboard or scanner,
software configuration data reflects one or more of firmware properties or software properties,
device settings data reflects one or more of security settings, power use settings or accessibility settings, and
device status data further includes one or more of a consumable level, device alert or device error condition.

20. The system of claim 19 wherein device reconfiguration instructions include one or more of device setting changes, device software changes or device hardware changes.

* * * * *